(No Model.)

J. TRUMP.
PLOW.

No. 283,687. Patented Aug. 21, 1883.

Attest:
J. Richards
John H. Johnson

Joseph Trump
Inventor.
by
Henry Millward
his attorney

UNITED STATES PATENT OFFICE.

JOSEPH TRUMP, OF HUNTSVILLE, ALABAMA.

PLOW.

SPECIFICATION forming part of Letters Patent No. 283,687, dated August 21, 1883.

Application filed May 9, 1883. (No model.)

*To all whom it may concern:*

Be it known that I, JOSEPH TRUMP, of Huntsville, county of Madison, State of Alabama, have invented a new and useful Improvement in Plows, of which the following is a specification.

Figure 1:
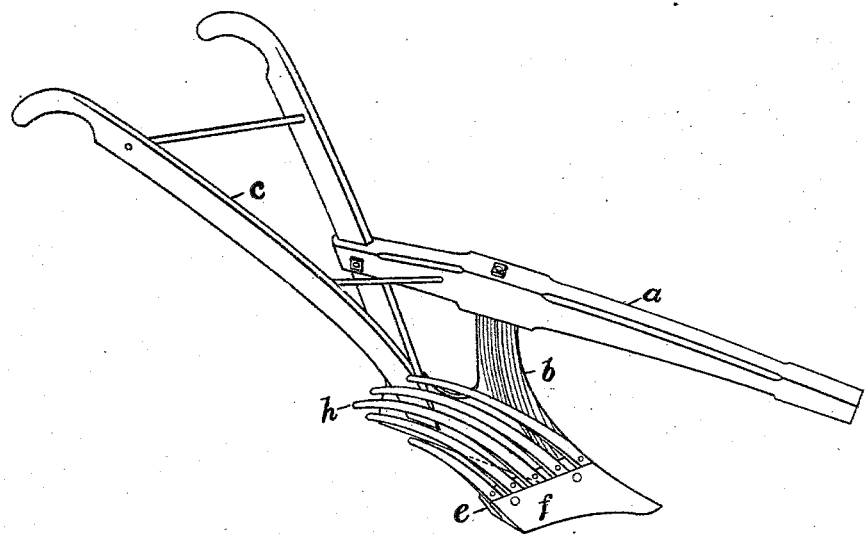
Figure 2:
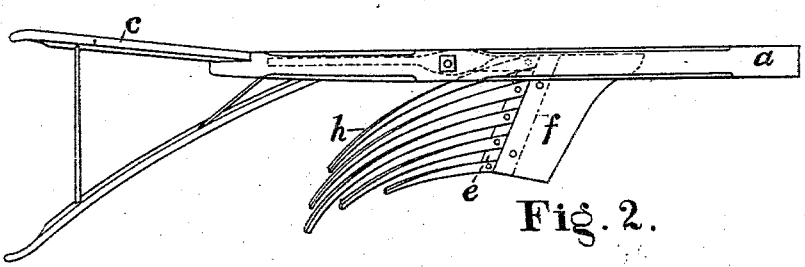
Figure 3:
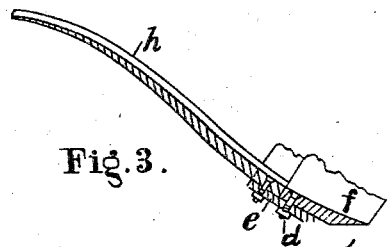

In the accompanying drawings, Figure 1 is a perspective view of a plow of my invention. Fig. 2 is a plan view of the same, and Fig. 3 is a sectional elevation taken through the share and flexible mold-board. In each of these figures letters of like character indicate corresponding parts.

The object of this invention is to produce a plow that is adapted for use in extremely tenacious soil, such as that upon which cotton is cultivated in the Southern States. The difficulty experienced when plowing in such soil is due to the impracticability of ordinay plows to turn the furrow-slice on account of the tenacity of the soil causing it to rest in front of the share and impair its cutting properties instead of rolling from the mold-board, as would be the case in less tenacious soil.
The invention consists in the construction and arrangement of parts, as will be hereinafter more fully specified, and pointed out in the claim.

The stock of this plow is of the customary construction, consisting of a beam, $a$, standard $b$, stilts $c$, and a clevis for attachment of the draft. The share $f$ may be made of cast-steel, and is secured to the stock by means of screw-bolts $d$. In this way it can be readily removed and replaced. The standard $b$ is provided with a laterally-projecting support, $e$, for the accommodation of the share $f$, and also that of the series of flexible fingers $h$. These flexible fingers are secured to the aforesaid lateral projections by means of screw-bolts, as shown by the drawings, and they are concave from the share back, and of a semicircular form, curving away from the standard $b$, in a manner to elevate their free ends higher than their fastened ends, and at the same time at a greater distance from the aforesaid standard. These flexible fingers are preferably constructed of spring-steel and made thicker at their fixed ends. It is also found to be better in practice to have the spaces between said fingers greater at the free than at the fixed ends.

When this plow is in operation, the fingers $h$ form a concave skeleton mold-board, and each finger is free to be moved independent of the others when acted upon by the soil; thereby partially pulverizing the soil and reducing it to a tractable state.

Having thus described my invention, what I claim as new, and desire to secure by Letters Patent, is—

A plow provided with a skeleton mold-board formed of flexible fingers, in combination with an interchangeable share that is fastened to the same laterally-projecting part of the stock as the aforesaid fingers.

In testimony whereof I have hereunto set my hand this 12th day of April, 1883.

JOSEPH TRUMP.

Witnesses:
W. B. LEEDY,
I. R. JONES.